No. 705,415. Patented July 22, 1902.
T. C. MANSON.
AIR BRAKE ATTACHMENT.
(Application filed Feb. 19, 1901.)
(No Model.)
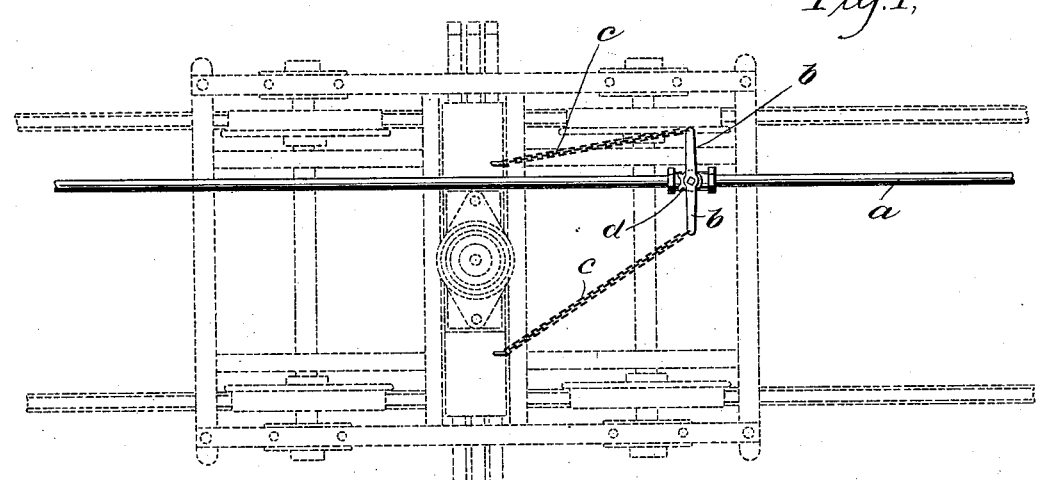
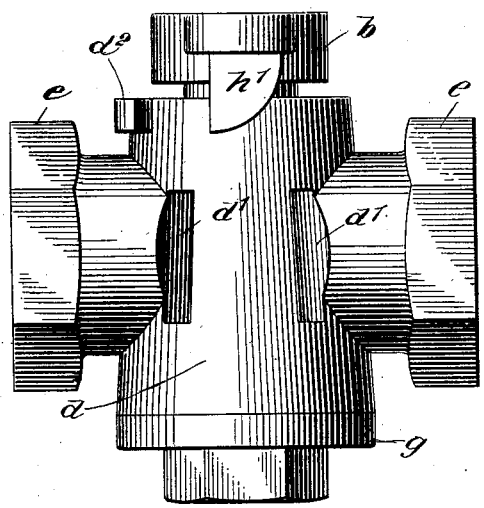
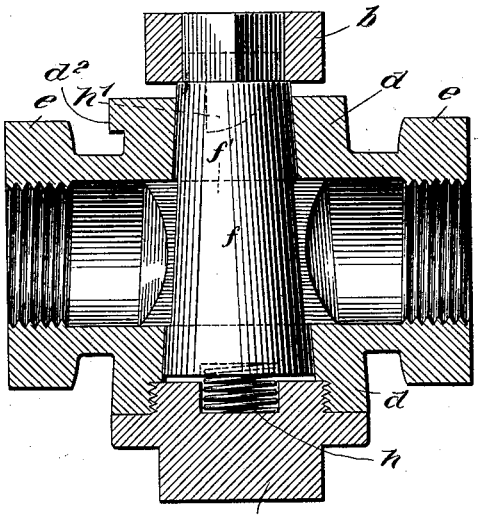
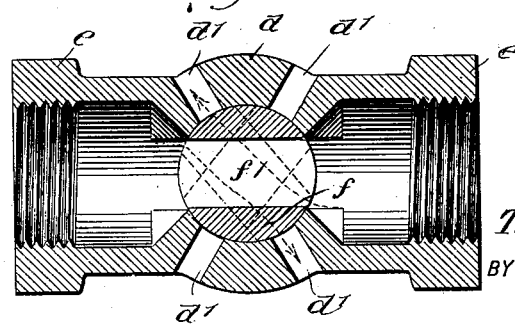
WITNESSES:
Edw Thorpe
F. B. Owens
INVENTOR
Thomas C. Manson
BY
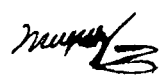
ATTORNEYS
THE NORRIS PETERS CO., PHOTO-LITHO., WASHINGTON, D. C.

United States Patent Office.

THOMAS CHARLES MANSON, OF LAKE CHARLES, LOUISIANA, ASSIGNOR OF TWO-THIRDS TO CHARLES SMITH AND ARCHIE PIERCE SALE, OF LAKE CHARLES, LOUISIANA.

AIR-BRAKE ATTACHMENT.

SPECIFICATION forming part of Letters Patent No. 705,415, dated July 22, 1902.

Application filed February 19, 1901. Serial No. 47,961. (No model.)

*To all whom it may concern:*

Be it known that I, THOMAS CHARLES MANSON, a citizen of the United States, and a resident of Lake Charles, in the parish of Calcasieu and State of Louisiana, have invented a new and Improved Air-Brake Attachment, of which the following is a full, clear, and exact description.

This invention relates to an air-brake attachment which acts to cause the instant application of the brakes upon the derailment or other disarrangement of the trucks of a car or cars. This end I attain by placing a cock in the train air-pipe or in some other analogous part of the brake system containing the air-pressure and connecting this cock with the truck or trucks. The parts are so adjusted that should the truck become disarranged, and thereby endanger the safety of the train, the cock will be opened to exhaust the train-pipe, and the brakes will be applied.

This specification is the specific description of one form of the invention, while the claims are definitions of the actual scope thereof.

Reference is to be had to the accompanying drawings, forming a part of this specification, in which similar characters of reference indicate corresponding parts in all the views.

Figure 1 is a view showing the use of the invention, a railway-truck being indicated by dotted lines. Fig. 2 is a side view of the cock which I employ. Fig. 3 is a longitudinal section thereof; and Fig. 4 is a horizontal section of the same, showing it in normal adjustment and indicating its abnormal adjustment by dotted lines.

Referring to Fig. 1, $a$ indicates the train air-pipe, which has the cock applied thereto. $b$ indicates the cross-arm, which is connected with the plug of the cock to operate the same, and $c$ indicates chains or rods attached to the ends of the arms $b$ and to the truck at opposite sides of the center plate thereof, these chains or rods being such as will allow all normal movements of the trucks in turning curves and otherwise without transmission to the arms $b$; but should the truck become derailed or assume any other abnormal position the movements of the truck will be transmitted through the chains or rods $c$ to the arms $b$ and the cock will be opened. This will exhaust the train-pipe, and the brakes will instantly be applied.

The cock comprises a barrel $d$, with nipples $e$ at its ends for engagement with the air-pipe. This barrel is bored transversely to place the nipples $e$ in communication, and the barrel is also bored longitudinally for the reception of the plug $f$. The barrel is provided at each side with two ports $d'$, thus forming four ports which communicate with the interior of the barrel and with the atmosphere. The plug $f$ has a transverse port $f'$ formed therein. When the plug is moved to the position shown in Fig. 4, the air-pipe is closed, and the air-pressure within the air-pipe cannot be exhausted through the ports $d'$ into the atmosphere, since there is then no communication between the nipples $e$ and the ports $d'$. However, should the plug $f$ be turned to either of the positions indicated by dotted lines in Fig. 4 the port $f'$ will then be in communication with both of the nipples $e$ and with two of the ports $d'$, thus exhausting the air-pipe.

A cap $g$ is screwed into the bottom of the barrel $d$, and a spring $h$ bears between the cap and the plug $f$ to hold the plug properly seated. The arm $b$ is provided with two downwardly-projected lugs $h'$, located, respectively, on opposite sides of the barrel $d$ and adapted to engage with lugs $d^2$ on the exterior of the barrel, whereby to limit the movement of the arm $b$, and consequently of the plug $f$.

Having thus described my invention, I claim as new and desire to secure by Letters Patent—

1. A cock, comprising a barrel provided with two ports at each side of the longitudinal axis of the cock, and a plug mounted in the barrel and provided with a single port adapted when the plug is turned in one direction to close the ports of the barrel and establish communication between opposite ends of the barrel, and when turned in another direction to establish communication between both ends of the barrel and two opposite ports of the barrel, as set forth.

2. In an air-brake system, the combination with a truck, and a train-pipe, of a cock arranged in the train-pipe and comprising a barrel having two openings on each side, and a plug mounted in the barrel and provided with a single transverse port, a cross-arm connected with the plug, and a flexible connection between the ends of the arms and the truck, as set forth.

In testimony whereof I have signed my name to this specification in the presence of two subscribing witnesses.

THOMAS CHARLES MANSON.

Witnesses:
BEN. M. FOSTER,
W. RALPH CALHOUN.